United States Patent Office 3,297,899
Patented Jan. 10, 1967

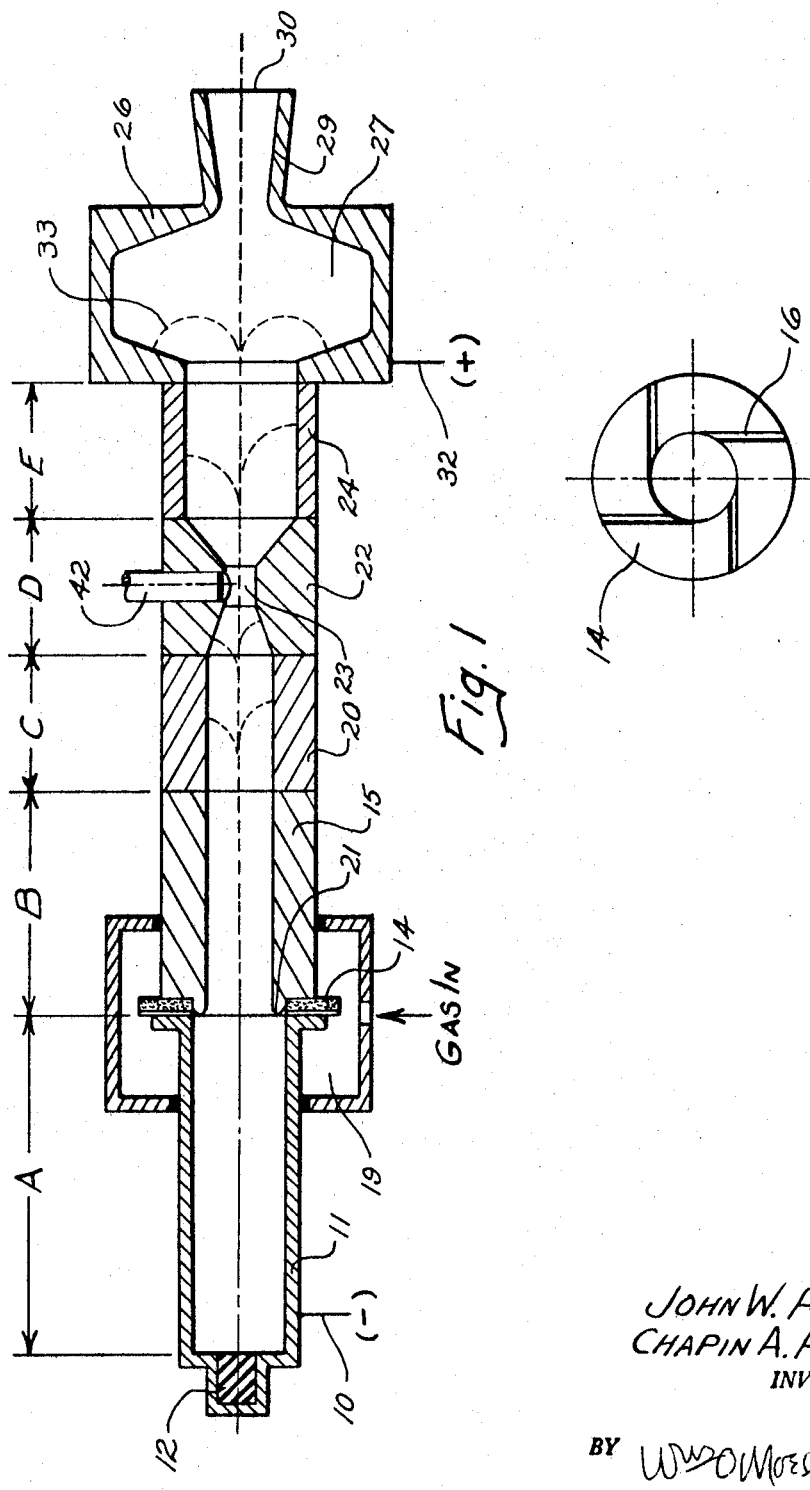

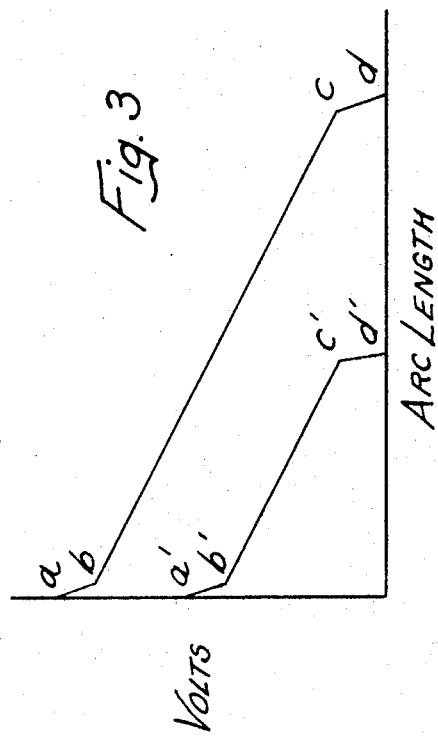
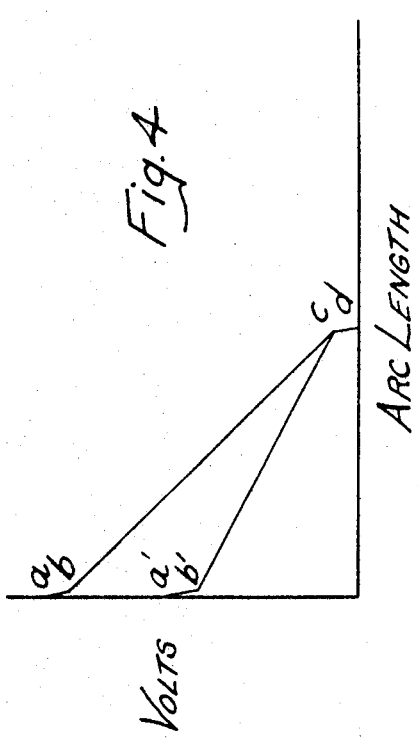
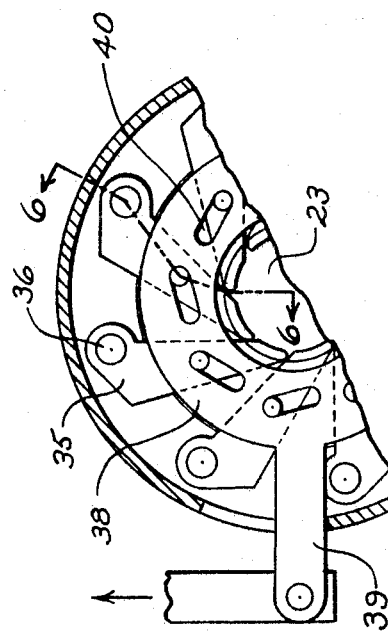
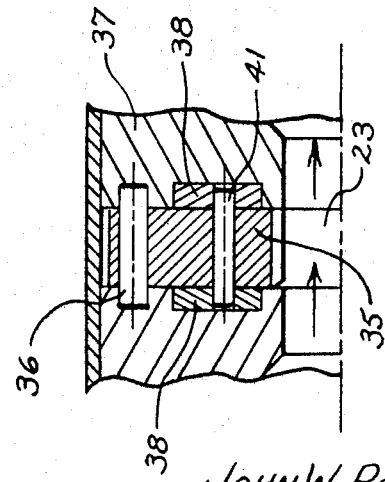
John W. Poole
Chapin A. Pratt
INVENTORS

3,297,899
ELECTRIC ARC TORCHES HAVING A VARIABLY CONSTRICTING ELEMENT IN THE ARC PASSAGEWAY
Chapin A. Pratt, Hanover, and John W. Poole, Lebanon, N.H., assignors to Thermal Dynamics Corporation, a corporation of New Hampshire
Filed Jan. 24, 1964, Ser. No. 340,030
2 Claims. (Cl. 313—231)

Our invention relates to high temperature devices and relates more particularly to an electric arc torch of the type in which an arc is stabilized by a plasma forming gas, whereby a high temperature effluent is produced.

Modern technology in a variety of fields including space exploration and the production and testing of new substances and materials has created increasing demands for improved high temperature sources which can be controlled to suit the particular applications.

In electric arc torches, operation at the high power outputs is often desired. The usual limitation encountered is the permissible amperage values, dictated in some cases by power supply capacities, or in other cases by torch geometry and torch materials. The power (in watts) delivered at the torch is, of course, the product of the amperage and arc voltage drop. In order to operate at the highest levels desired, it is necessary to achieve higher arc voltages, with the ampere limitations discussed above in mind. High currents also produce adverse electrode erosion. There is a peak current limit of operation, and in order to attain increased power levels of operation, the voltage must be increased while holding the current to its maximum permissible value.

The conditions making for the desired high voltage operation also make for effluent conditions which are often undesirable or actually unacceptable. For example, a jet flame of high power but low pressure may be required. Our invention provides means for operating at high voltages (to produce the required power levels) yet producing the type of jet flame not normally associated with high voltage operation.

For a better understanding of our invention attention is now directed to the following detailed description and the associated drawings, in which FIGURE 1 is a view, in cross section, of a high powered plasma torch unit incorporating the principles of the invention;

FIGURE 2 is a detailed plan view of an element of the torch of FIGURE 1;

FIGURES 3 and 4 are graphs illustrating torch operating parameters as discussed below;

FIGURE 5 is a view in section of a variable control element for the torch; and

FIGURE 6 is a view in section taken along the lines 6—6 of FIGURE 5.

Referring now more particularly to FIGURE 1, a torch body is shown constructed of segmented units each performing a particular function. Current is supplied from a power unit (now shown) to a cathode piece 11 through lead 10. At the bottom of the well defined by cathode piece 11 we provide a tungsten element 12. The arc emanates from this element and is positioned there by the action of a vortex of plasma forming gas, introduced under pressure to a chamber 19. A ceramic swirl ring 14, best shown in FIGURE 2, contains tangential slots 16 through which the gas enters the torch as a high pressure vortex. This ring is further described in U.S. Patent 3,027,446, issued March 27, 1962.

Downstream from the cathode piece 11 are sections 15 and 20 which define a portion of the arc passageway. On section 15, where it abuts the ring 14, we have found it desirable to form a shoulder 21 to deflect the incoming vortex toward the cathode well, thus insuring the stable positioning of the arc in the well and in a central position where it will remain, emanating from the tungsten element 12.

The cathode piece 11 is electrically insulated from the remainder of the unit and the return to the power supply is made through lead 32, as shown, thus providing an anode which is electrically identified with the arc passageway.

We next provide an element 22 which defines a portion of the arc nozzle having a reduced cross-sectional area. It is this restriction to gas flow which makes possible the high pressure operation in all arc passage regions upstream from it. Piece 24 defines a further section of the nozzle which operates at reduced pressure because of the pressure drop across the restrictive element 22. A plenum chamber 27 serves to smooth out the plasma flow prior to its discharge at opening 30 in piece 26. For supersonic expansion a divergent passage 29 is provided.

Before returning to FIGURE 1 and the remaining figures, a general discussion of torch operating characteristics is in order. It has been seen that maximum power levels of operation are achieved only at high voltages. In addition to current level limitations discussed heretofore, electrode losses are minimized by high voltage operation. The actual power delivered to the plasma is the power supplied less electrode and radiation losses which appear as heating of the cooling water supplied to water jackets surrounding the torch in a manner well understood in the art.

Arc voltage drop itself, the measure of realized power (taken with current) is affected by three major factors for any given plasma forming gas. First, the arc length is important. Doubling the length of the arc column doubles the arc voltage along the column, all other conditions remaining constant. Of course, the electrode voltage drops remain the same. The effect of increased arc length is illustrated in FIGURE 3 where two arcs of different length are compared. The voltage drops $ab$ and $a'b'$ are the cathode drops and are shown to be the same. This is also true at the anode, where $cd$ and $c'd'$ are the same value. The arc column drops are the lengths $bc$ and $b'c'$. The arc represented by $abcd$ is approximately double the length of arc $a'b'c'd'$. It is thus seen that the longer arc has the greater voltage drop. Thus, at a given current level, the arc $abcd$ represents the higher realized power condition.

A second important factor affecting arc voltage is the pressure of the gas in which the arc is maintained. The higher the pressure, the greater the voltage drop per unit length of the arc. This is illustrated in FIGURE 4 which compares two arcs of equal length operating at different gas pressure levels. For purposes of simplifying the comparison, the electrode electrical losses are assumed to be the same for each of the two cases. The voltage gradient along the arc column increases with pressure. Thus, the column drop $bc$ of arc $abcd$ is greater than that of $b'c$ of arc $a'b'cd$. For a given arc length the arc voltage varies driectly with the gas pressure. To maximize power for an arc of given length the gas pressure should be increased to its upper permissible level. This level is governed by the gas supply, the structural strength of the torch device, and various other factors including increased radiation losses from the arc and erosion effects on the anode.

The third major factor affecting the arc voltage is commonly termed "arc constriction." All other factors remaining constant, an increase in the gas vortex intensity leads to higher voltage gradients along the arc column. Such vortex strength increase can be accomplished by increasing the gas flow rate keeping the nozzle passage diameter and the arc length constant. Conversely, at a given gas flow rate, the vortex strength is increased by reducing the diameter of the arc passage. However, decrease of the passage diameter usually leads to a reduction in the arc length thus leading to an actual reduction in the total arc voltage. In other words, to achieve higher arc voltage by means of voltage gradient increase, this effect must be larger than a drop in arc voltage due to decrease in arc length. Arc constriction refers to an actual "squeezing" action caused by the gas flow on the arc column.

Returning now to the invention herein, its value may be best understood in reference to a particular operating specification. Assume that we require that a plasma be produced containing the equivalent of 1,000 kw. of heat energy and that this plasma must be available for expansion from the relatively low pressure of 60 p.s.i.g. A conventional torch device, to produce the required plasma at an overall conversion efficiency of 50% (electric energy supplied to the torch which appears as heat in the final plasma), must operate at 2,000 kw. For the case in question a power supply of maximum current output of 900 amperes was available. The same supply could operate to as high as 13,000 v. To provide the 2,220 v. arc operation required at 900 amperes to produce 2,000 kw., a conventional unit would cause the plasma to expand from a pressure of over 200 p.s.i.g. Thus, the conventional unit could not satisfy these particular requirements.

In meeting these particular specifications the geometry of the torch of FIGURE 1 was found to be successful. The pressure upstream of the restrictive element 22 is held at elevated values to provide the required voltage level of operation. The gas pressure is reduced by the pressure drop across element 22 to the desired level of 60 p.s.i.g. prior to expansion through the nozzle 29. The particular torch dimensions are given in Table I:

TABLE I

| Arc Passage Section | Length (inches) | Diameter (inches) |
|---|---|---|
| A | 11⅝ | 1¾ |
| B | 6½ | ¾ |
| C | 3 | ¾ |
| D | 3 | ½ |
| E | 6 | 1 |

The plenum chamber 27 was 3 inches in diameter with a square nozzle throat section of 0.870 inch square. The nozzle exit 30 had an area of one square inch.

The operating results are as follows:

The total arc length ranged up to 30 inches actually reaching into the rear portion of the plenum chamber, as shown by the arc filaments 33. There was some evidence of anode action ahead of and through the restriction piece. The upstream pressure was 215 p.s.i.g. with a plenum pressure of 60 p.s.i.g. Expansion across the injector slots 16 was from an upstream pressure of 800 p.s.i.g. The current was 823 amperes at a voltage of 2650 v. for a power to the torch of nearly 2,200 kw. The thermal efficiency was 42%, or somewhat lower than originally assumed, giving a total heat content of the plasma of 920 kw. An upward adjustment of the current, or a slight decrease in the diameter of the restriction 23 would increase the power by the necessary amount to satisfy the specifications. An alternate way to increase the voltage is to increase the length of the reduced passage in element 22.

It is thus seen that by proper selection of the variables our plasma torch can operate at high pressures and yet be adapted to produce a relatively low pressure outlet gas.

Other operating conditions than those of the foregoing example can be obtained merely by changing element 22. For example, a smaller restriction 23 will result in an increase in the upstream operating pressure. It is not uncommon to operate our devices at pressures of over 1,000 p.s.i.g. Thus, proper choice of element 22 can serve to extend the operating range of what would heretofore be of necessity a high-velocity jet torch to one having a much wider spectrum of usable jet velocities.

High power arc torches are frequently utilized to simulate the conditions imposed on a vehicle re-entering the earth's atmosphere. At high altitude the body is traveling at an extreme velocity. This condition can be approximated by expanding the plasma through a large pressure drop. In this case no restricting element would be imposed ahead of the final expansion nozzle. At a later time the vehicle will have slowed appreciably and will be in a lower region in the atmosphere characterized by higher density. If the simulation conditions are taking place within a vacuum chamber, the vacuum can be continuously adjusted to assist in meeting these changing conditions. However, change of vacuum conditions alone is not sufficient. To simulate the diminishing velocity of the vehicle, yet maintaining the plasma jet at high thermal content, a change in torch geometry is required. It may also be desirable to change the mass flow and power levels as well during the re-entry simulation.

To produce this effect we provide, in place of element 22 of FIGURE 1, a section of the nozzle in which the orifice may be continuously varied, as shown in FIGURES 5 and 6. The mechanism consists of an iris type closure having a plurality of segments 35 pivoted at 36 in the wall portion 37 of the torch nozzle. A rotatable divided plate 38 may be actuated at the arm 39 integral therewith. A series of slots 40 in the plate 38 engage pins 41 mounted on iris segments 35. These segments are so shaped that upon rotation of the plate 38 in the direction shown by the arrow, the partial closure of the passage 23 is accomplished. Another technique is to provide for the insertion of one or more rods 42 radially into the passageway 23 (see FIGURE 1) to thereby reduce its cross-sectional area.

With the mechanism of FIGURE 5, a servo motor may be added to actuate the arm 39, said servo being controlled by pressure readings at the effluent region. Transducers at that point would then have their outputs fed to the servo in a manner commonly understood, to thus automatically provide and maintain the desired operating parameters.

While we have described a particular embodiment of our invention and disclosed some practical operating figures and dimensions we intend to comprehend in our invention all variations and modifications within the spirit and scope of the following claims.

We claim:

1. An electric arc torch comprising a first electrode, a second electrode in the form of a nozzle defining an elongated arc passageway, means for establishing an arc between said electrodes, gas means for stabilizing said arc in said passageway, and a variably constricting element in said nozzle positioned along said passageway to produce a distinct gas pressure drop across said element.

2. A torch according to claim 1, and having sensing means to measure said drop and control means responsive to said sensing means to control said variable element.

References Cited by the Examiner

UNITED STATES PATENTS 3,042,830  7/1962  Orbach _____ 313—231
3,077,108  2/1963  Gage et al. _____ 313—231 X
3,118,046  1/1964  Harrington _____ 219—75

FOREIGN PATENTS 938,473  2/1956  Germany.

JAMES W. LAWRENCE, *Primary Examiner.*

S. A. SCHNEEBERGER, *Assistant Examiner.*